(12) United States Patent
Berger et al.

(10) Patent No.: US 9,331,321 B2
(45) Date of Patent: May 3, 2016

(54) FABRIC COMPOSITE SUPPORT OR ENCLOSURE FOR AN AUTOMOTIVE BATTERY PACK

(75) Inventors: Elisabeth J. Berger, Farmington Hills, MI (US); Kestutis A. Sonta, Troy, MI (US); Bhavesh Shah, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 13/434,904

(22) Filed: Mar. 30, 2012

(65) Prior Publication Data

US 2012/0251863 A1   Oct. 4, 2012

Related U.S. Application Data

(60) Provisional application No. 61/470,021, filed on Mar. 31, 2011.

(51) Int. Cl.
*H01M 2/10* (2006.01)
*H01M 2/02* (2006.01)
*H01M 2/04* (2006.01)

(52) U.S. Cl.
CPC ............ *H01M 2/1094* (2013.01); *H01M 2/024* (2013.01); *H01M 2/0237* (2013.01); *H01M 2/0262* (2013.01); *H01M 2/043* (2013.01); *H01M 2/0478* (2013.01); *H01M 2/1083* (2013.01)

(58) Field of Classification Search
CPC . H01M 2/0237; H01M 2/024; H01M 2/0262; H01M 2/043; H01M 2/0478; H01M 2/1094; H01M 2/1083
USPC .................................................. 429/99, 100
See application file for complete search history.

(56) References Cited

U.S. PATENT DOCUMENTS

| | | | | |
|---|---|---|---|---|
| 5,378,555 | A | * | 1/1995 | Waters et al. ................... 429/97 |
| 5,948,298 | A | * | 9/1999 | Ijaz ..................... B60L 11/1803 |
| | | | | 180/68.5 |
| 6,040,080 | A | * | 3/2000 | Minami et al. ................... 429/96 |
| 6,109,380 | A | * | 8/2000 | Veenstra ...................... 180/68.5 |
| 6,521,371 | B1 | * | 2/2003 | Lavanture ..................... 429/100 |
| 2005/0123830 | A1 | * | 6/2005 | Hardigg et al. ............... 429/175 |
| 2006/0246348 | A1 | * | 11/2006 | Hamada et al. ............... 429/148 |
| 2009/0186270 | A1 | * | 7/2009 | Harada et al. ................. 429/185 |
| 2012/0103714 | A1 | * | 5/2012 | Choi et al. ................... 180/68.5 |

* cited by examiner

*Primary Examiner* — Jonathan Jelsma
(74) *Attorney, Agent, or Firm* — Reising Ethington P.C.

(57) ABSTRACT

A battery enclosure comprising a support and a cover fabricated from a thermoset or thermoplastic polymer reinforced by at least a woven fabric reinforcement is described. In an embodiment the reinforcement is a woven glass fabric.

19 Claims, 3 Drawing Sheets

FABRIC COMPOSITE SUPPORT OR ENCLOSURE FOR AN AUTOMOTIVE BATTERY PACK

This application claims priority based on provisional application 61/470,021, titled "Fabric Composite Support or Enclosure for an Automotive Battery Pack," filed Mar. 31, 2011 and which is incorporated herein by reference.

TECHNICAL FIELD

This invention pertains to a strong, light-weight and corrosion resistant structure to carry, retain and enclose a large, high voltage battery pack within an electric or hybrid vehicle. More specifically, this invention pertains to the design and use of a molded, resin bonded, woven glass or carbon fiber fabric structure for a battery pack support, tray, cover, enclosure or the like.

BACKGROUND OF THE INVENTION

Electric and hybrid vehicles employ a battery pack, generally incorporating a high voltage battery rated at 300 volts or above, for storage of electrical energy. The power from such a battery pack may be applied to an electric motor, a traction motor, for propelling the vehicle. These battery packs, are intended to convey to the vehicle an appreciable useful range and consist of a plurality of individual cells appropriately connected together in series and parallel to satisfy the voltage and energy storage requirements. Typically such battery packs also include systems to monitor and control the battery condition, including its state of charge, as well as high-voltage contactors and bus bars for charging and discharging the battery pack. Battery packs are often confined in a light-weight, non-structural casing and may also include provision for cooling to maintain the batteries in a preferred operating range.

Even with the use of higher power density batteries employing advanced battery chemistries, for example lithium ion batteries, the mass of such battery packs may be appreciable and constitute a significant portion of the vehicle mass. Adding to the overall contribution to vehicle mass is the need for an enclosure consisting of a tray, or similar support structure, and a cover to secure the battery pack in the vehicle. Of course, such enclosures must be suitably robust and stiff to accommodate, in addition to static loads, the dynamic loads which will occur in service. Further, these structural enclosures must be compatible with adjacent chassis or body members of the vehicle.

Battery pack enclosures have been fabricated from steel or magnesium. But steel, with its relatively high density adds more vehicle mass than desired, and magnesium, though of low density, is prone to corrosion if exposed to aqueous environments, and has limited ductility. There is therefore a need for a robust, low density, battery pack enclosure.

SUMMARY OF THE INVENTION

Battery packs, used in hybrid and electric vehicles, incorporate batteries and other elements, often confined within a non-structural casing. When incorporated into a vehicle the battery packs must be supported and restrained using a structural support or enclosure.

Heretofore such supports and enclosures have been fabricated of metal but there is interest in substitution of polymer structures for these metal structures because of their potential for mass reduction and superior corrosion performance. However, the strength and stiffness of polymers, particularly those polymers in common use, is generally inferior to the strength and stiffness of metals.

But the strength and stiffness of polymers may be increased by incorporating reinforcements within the polymer. Further, the stiffness of a polymer structure may be made comparable to that of a metal structure through design changes to the structure. Since many polymer structures are molded, stiffening ribs or other features to enhance part stiffness may be readily introduced into the structure through modification to the mold.

A suitable reinforcement is a woven fabric which imparts continuous strand reinforcement, biaxially, as opposed to chopped random reinforcement or unidirectional layups. For example, a coarse strand, woven glass cloth such as Fiberglass Industries Rovcloth 1854 is a basket weave structure with five strands per inch in the warp direction and three and a half strands per inch in the weft direction. This fabric provides continuous biaxial reinforcement, and is easily deformable. Coarser or finer weaves may also be employed, but a coarse strand fabric is preferred, as it is more deformable than a fine strand, and tends to be less expensive. Other weave structures such as plain weave, twill weave, or satin weave may also be suitable. A layered reinforcement comprising several reinforcing layers may be used. These additional reinforcing layers may also be woven fabric, typically oriented at some angle, usually 45°, to the primary reinforcement, or a fiber mat, or oriented fibers, or randomly-oriented chopped fibers, or any combination of these.

Glass is a suitable reinforcement material but higher performance reinforcing materials based on carbon or aramid fibers may also be used. Reinforcement materials may be combined. For example, a woven, glass fiber reinforcement may be supplemented with a layer of chopped carbon fibers.

The polymer matrix may be a heat-curable, thermosetting resin which may be impregnated into the reinforcements to form a prepreg and then cured in a shaped mold at elevated temperature. Suitable resins include epoxy or vinyl ester, which may be formulated as the paste used in sheet molding compound (SMC). Vinyl ester paste offers the advantage of being suitable for compounding on a conventional line currently used for SMC, with only minor modification. Other possible thermosetting resins include room temperature-curable thermoset resins, such as some epoxies.

The polymer matrix may also be a thermoplastic, with higher performance resins such as polyamide or polyphenylene sulfide being preferred. Thermoplastic matrix reinforced polymers may be prepared as sheets of bulk thermoplastic-impregnated reinforcement. These may be cut, if necessary, heated and shaped to a desired form in a mold, before cooling in its final shape. Alternatively, thermoplastic fibers may be comingled with the reinforcing fibers to form a flexible composite fabric which may be stored in roll form. Components may be fabricated by cutting a suitable length of the composite rolled fabric, heating it above the polymer glass transition temperature placing it in a mold and allowing the flowable thermoplastic to impregnate the reinforcing fibers, and cooling to below its glass transition temperature while in the mold.

Battery packs, or their exterior casing, may exhibit a variety of different forms, from relatively compact, rectangular footprint, box-like units to specialized shapes intended to fit within irregularly-shaped cavities in a vehicle. It is anticipated that a single battery pack will be contained and supported by an enclosure of complementary shape. On occasion however it may be preferred to accommodate multiple battery packs into a single enclosure.

The form of the enclosure will generally mimic the form of the battery pack, so, just as the battery pack may be regular or irregular in plan or of constant or variable height, so may the enclosure. The enclosure may be of uniform or variable thickness and of uniform or variable strength depending on the mounting and loading requirements of a particular vehicle. An enclosure may also incorporate pads, supports or hooks attached to or embedded in the enclosure to enable lifting and transporting the enclosure, and its battery, during fabrication of the enclosure or during installation of the enclosure, and battery, in a vehicle.

The battery pack enclosure structure may generally resemble a closed box formed of an upper section, or cover, and a lower section, or support, secured together by mechanical fasteners, such as bolts, rivets or clamps, along a joint line and secured against intrusion by an elastomeric seal. Both the cover and support may be similarly-shaped and resemble shallow, flat-bottomed pans with pan walls which terminate in a flange oriented parallel to the bottom of the pan. The support and cover will typically have a common plan view form, but may also be of significantly different shapes, particularly different depths. The flange imparts stiffness to the structure and provides a mounting and sealing surface for the support and cover. The interior shape and volume of the support and cover are preselected to slidably engage the battery pack casing to secure it against undesired motion within the enclosure when subjected to in-service loads. Both the support and the cover contribute to the structural integrity of the battery retainer and both may be fabricated of the same reinforced polymer materials using the same fabrication processes. Alternatively, they may be of different materials, with one of them being fabricated using one material and process, and the other made with a different material and/or process.

The overall stiffness of the support and/or cover may be further increased by the addition of stiffening ribs in the base of the tray-like structure or by forming a sandwich structure in which a core of light weight material such as a metal honeycomb or foam or balsa wood or a polymer foam, is molded between two layers of fabric composite to form the tray base. Stiffening ribs may be similarly oriented or criss-crossed in a grid pattern. Supplementary reinforcement, usually fiber reinforcement, may be provided at rib locations particularly when the rib elevation is appreciable, say 10 millimeters or greater. A typical retainer, which may be irregular in plan view, may be contained within a rectangle of about 450 millimeters by 600 millimeters. But in other exemplary embodiments, particularly for highly irregular shapes, the bounding rectangle may be as large as about 1 meter by 1.5 meters, or even larger.

Other objects and advantages of the invention will be apparent from a description of preferred embodiments which follows in this specification.

DESCRIPTION OF PREFERRED EMBODIMENTS

Figure 1:
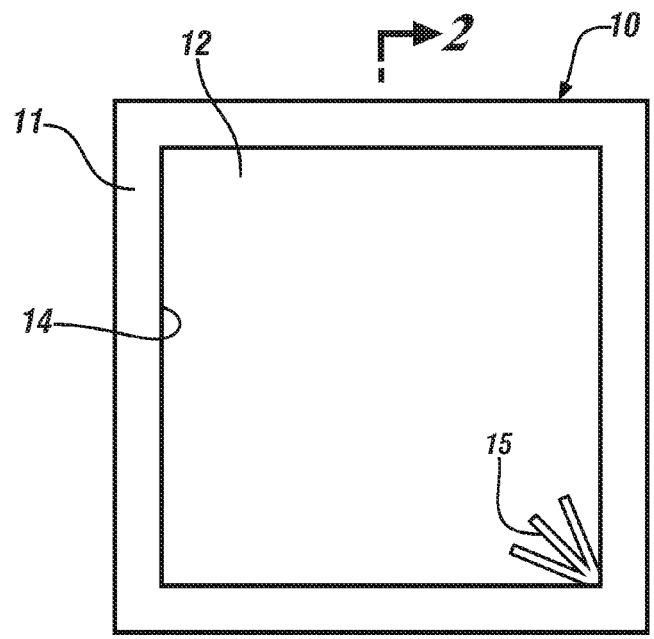
FIG. 1 shows a representation of a first embodiment of a battery support in plan view

The following description of the embodiment(s) is merely exemplary in nature and is not intended to limit the invention, its application, or uses.

Vehicles propelled by electric motors are becoming more widespread as more manufacturers supplement their product lines with hybrid or all-electric vehicles. Such vehicles incorporate a high voltage battery or battery pack as an energy storage device, the battery being suitably sized to provide capability for all-electric vehicle operation over some predetermined range.

These battery packs may range in weight from about 30 Kg to about 200 Kg and, when installed in a vehicle, are typically located in an enclosure. The enclosure is generally fabricated as two parts, a support structure, resembling a tray, with cavity geometry complementary to the exterior geometry of the battery pack, and a cover, which when joined to the support structure completes the enclosure. The interior cavity walls of at least the support, and, preferably the support and cover, slidably engage the exterior of the battery pack to provide close-fitting lateral restraint to the battery pack. Thus the enclosure not only supports the battery pack but also contains and restrains it under all expected operating conditions and so must meet both strength and stiffness requirements. For this reason most support structures have been metal-based and fabricated of either steel or a magnesium alloy. However, the use of steel adds appreciably to the overall vehicle mass, and magnesium alloy, though significantly lighter than steel, has limited ductility and poor corrosion resistance if exposed to the environments commonly encountered in normal vehicle operation.

Supports fabricated of polymer materials would offer several advantages, particularly with respect to corrosion, and offer significant opportunity for mass reduction. But the reduced strength and stiffness of unreinforced polymers relative to metals renders them uncompetitive with metals.

However suitably reinforced polymer matrix composites may be competitive with metals. The behavior of such reinforced polymer matrix composites is largely dictated by the nature of the reinforcement and its interaction with the polymer matrix.

Illustrative examples of possible battery support structure configurations are shown in FIGS. 1-6. For simplicity, and without limitation, the battery support structures are shown as box-like, that is: generally rectangular in plan view; with a generally flat horizontal floor or battery support surface; and with generally vertical walls of common height. However it will be appreciated that in positioning a battery or a battery pack in a vehicle, packaging considerations may mandate other geometries. Without limitation, such packaging considerations may lead to plan view configurations resembling the letter "T" or a cruciform configuration resembling the mathematical symbol for addition "+" or other regular or irregular geometric forms. Similarly the floor may be 'stepped', 'ramped' or otherwise of variable height to conform, for example, to a like geometry in a vehicle floorpan. Also the wall length may vary around the perimeter, either because of variation in battery 'height' or because some of the required wall length required by the battery 'height' is provided by a cover with a deeper wall, enabling use of a shallower wall in the support. Also, support structure 10 is depicted as being of generally uniform thickness, but in this example, as well as the examples to follow, the structure may selectively comprise regions of greater or lesser thickness.

Figure 2:
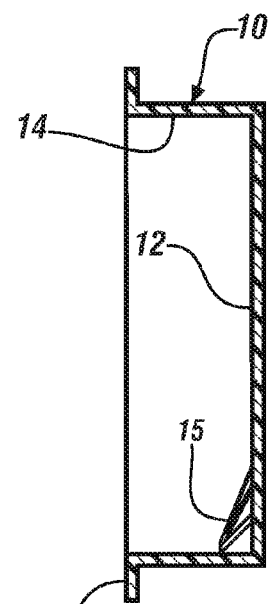
FIG. 2 shows the first embodiment of FIG. 1 in cross-section.

FIGS. 1 and 2 show a first embodiment of a support structure 10 in plan and cross-sectional views respectively. In plan view (FIG. 1) the support is shown as having a rectangular form, with a flat surface or floor 12 bounded by a perimeter wall 14 and flange 11 appropriately sized for a particular battery pack. In cross-section (FIG. 2) the support structure 10 is shown to have the general form of a shallow rectangular pan.

Figure 3:
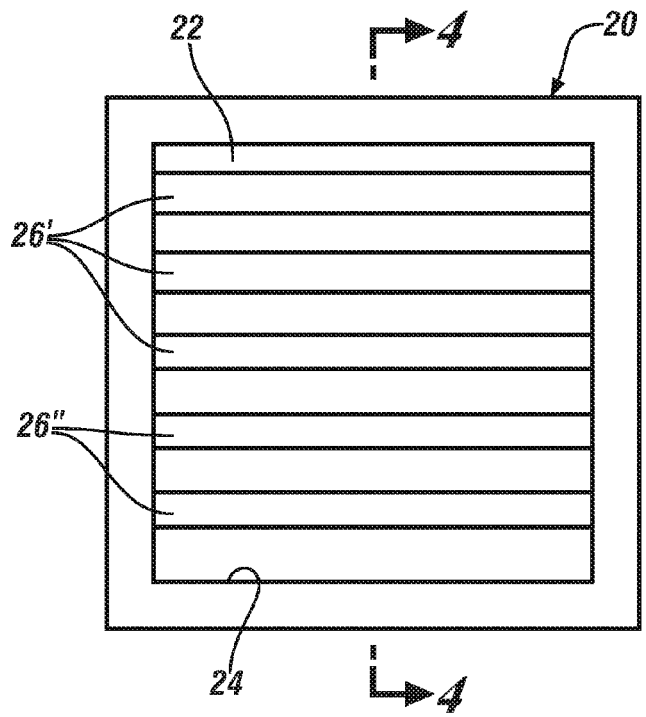
FIG. 3 shows a representation of a second embodiment of a battery support in plan view.
Figure 4:
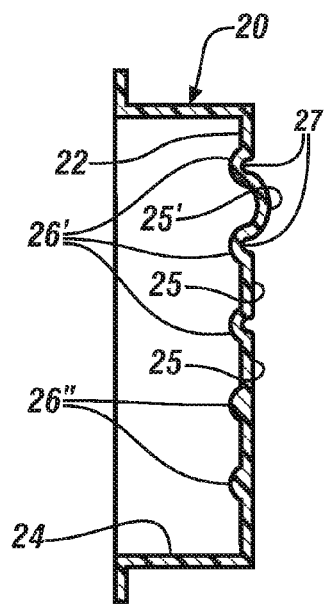
FIG. 4 shows the second embodiment FIG. 3 in cross-section, illustrating the use of ribs to further stiffen the structure.

FIG. 3 shows a second embodiment 20 of such a support. Again the support has the general form of a shallow square or rectangular pan. However, to impart added stiffness to the floor 22, stiffening features 26' and 26" have been incorporated in floor 22. Such features may range in elevation from about 10% of the thickness of floor 22 up to several times the thickness of the floor. Fibers may be suitably positioned for selective incorporation into the stiffening features. Analogous to FIG. 1, perimeter wall 24 is sized to accommodate, but closely conform to the outer wall of a battery pack (not shown) so that the battery pack may be well restrained by support 20. In cross-section the two stiffening feature configurations, shown as 26' and 26" may be distinguished. Features 26' are formed by bodily displacing a section of floor 22 and so creating a complementary recess 27 on undersurface 25 generating in floor 22 a local series of generally parallel ridges with intervening low regions or furrows conveying a generally corrugated appearance. Note that the low regions of the undersurface may be displaced in a direction opposite features 26' to form a contoured undersurface 25' or the undersurface 25 may be flat. As depicted, the lateral extent of the intervening low regions differs from the lateral extent of the ridges and the magnitude of their displacement from midplane 29 is likewise different. Such variation may commonly occur but more regular or symmetric arrangements are not precluded. Features 26" are ribs formed by laterally relocating material from floor 22 and forming the displaced material into a series of generally narrow and upstanding features extending from floor 22 and so result in a flat undersurface 25. Downstanding ribs (not shown) may also be employed. In the case of laterally displaced ribs 26", the ribs could incorporate supplementary reinforcements, for example, chopped glass or carbon fibers. Such supplementary reinforcements are most commonly used when the depth of the ridge is appreciable, say greater than 10 millimeters or so.

Figure 5:
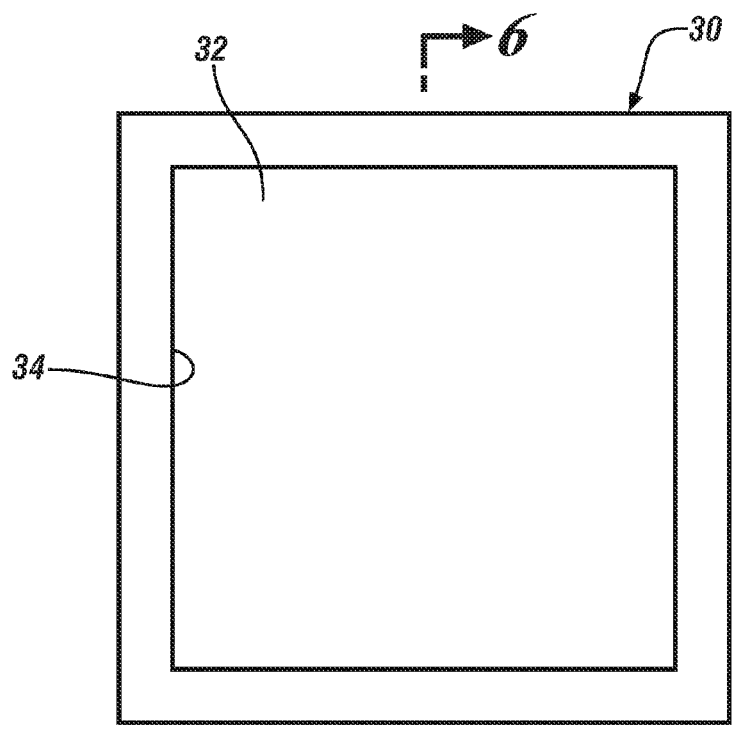
FIG. 5 shows a third embodiment of a battery support in plan view.
Figure 6:
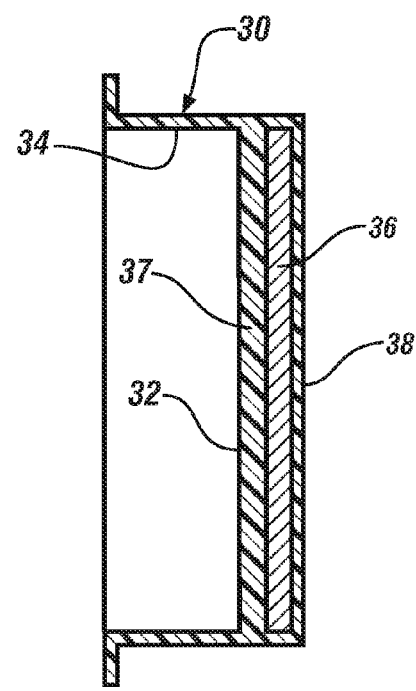
FIG. 6 shows the third embodiment of FIG. 5 in cross-section, illustrating the use of a lightweight core to further stiffen the structure.

A series of commonly-oriented, generally parallel, equally spaced apart ribs of common height is shown in FIG. 3. This configuration is intended to be exemplary and not limiting. Such generally parallel ribs may be oriented in any suitable direction and randomly spaced. For example, fan-shaped or radial configurations may be employed to selectively reinforce corners as shown at 15 in FIG. 1. Also, multiple sets of such parallel ribs may be oriented in any preferred orientations to form a criss-cross or grid pattern. Similarly, although all ribs have been shown with a common height the invention comprehends ribs of different height as well as ribs whose height varies along their length. So, for example, the fan-shaped configuration 15 of FIG. 1 may have features whose height progressively declines to zero with distance from the corner. FIG. 5 shows a third embodiment 30 of such a support, again shown as a shallow or rectangular pan. In this embodiment, however, additional stiffness is imparted to floor 32 by incorporation of a lightweight block of material 36 in floor 32, best seen in cross-section in FIG. 6. Material 36 may be a low density material such as a metal foam or honeycomb. Alternate materials such as polymer foam, balsa wood or a separate ribbed sheet-like structure may also be used. Material 36 must be able to be shaped to the desired form, for example by thermoforming, molding, machining, or by hand shaping, and resist excessive polymer intrusion during molding and maintain its shape and resistance to excessive polymer intrusion during polymer cure. Material 36 is bounded by reinforced polymer layers 37 and 38 and perimeter wall 34 has been correspondingly deepened to enable it to apply the same restraint to the battery pack (not shown) as is available from perimeter walls 14 and 24 of supports 10 and 20. The support shown may be molded as a single unit by overmolding material 36 or constructed by bonding material 36 and reinforced polymer layer 38 to a simple support like that shown in FIG. 1. In this circumstance 38 may be molded as part of the box section, then 36 and 37 may be bonded in with 37 replacing 32.

A suitable reinforced polymer may be based on epoxy or vinyl ester resins. Vinyl ester resins are particularly suitable since these resins are used in sheet molding compound, a formulation currently used to make polymer panels and many other shapes, and so procedures and processes already in use may be easily adapted to the practice of the invention.

A suitable reinforcement is a woven fabric which imparts biaxial mechanical properties to a composite while being sufficiently deformable to adapt to the geometry of the support. Such fabrics may be applied in layers with overlapping layers rotated with respect to one another as required. It will be appreciated by consideration of FIGS. 1-6 that it is intended that each of supports 10, 20 and 30 restrain battery pack motion in any in-plane direction so generally consistent in-plane properties in all directions are preferred. In some vehicle architectures, however, certain loadings will require higher properties in certain directions. One example might be a battery enclosure that is shaped such that torsional loading is greater than bending. In this case, the orientation of the fabric layers could be adjusted to accommodate this, for example with more layers at 45° than at 0 or 90°.

While only a continuous strand fabric reinforcement such as a woven or stitch-bonded fabric may be sufficient to impart suitable properties to the composite, additional reinforcing layers may be added to achieve the level of properties desired. For example these additional reinforcing layers may also be woven fabric, typically oriented at some angle, usually 45°, to the primary reinforcement, or a fiber mat, or oriented fibers, or randomly-oriented chopped fibers, or any combination of these.

Reinforcement or supplementary reinforcement may also be added selectively. The example of the stiffening rib structure shown in FIGS. 3 and 4 has already been addressed but other opportunities may exist. For example, the corners of the shallow pans 10, 20 and 30 may well experience the most severe loading. It may only be necessary to provide supplementary reinforcement in the corners. Similarly it may be beneficial to selectively slit or remove some of the reinforcement in small regions which will experience only light loading. This will facilitate forming a smooth support without wrinkles or waves resulting from puckering or folding of the woven cloth reinforcement in more heavily loaded regions. In larger areas which can tolerate less structure, the layers of fabric can be cut such that there are fewer layers in these areas, and the profile adjusted accordingly. This will help to save mass in the structure.

Opportunities for selective reinforcement are not confined to in-service loads. Supports, pads or hooks may be attached to or included in the enclosure to facilitate transport and installation of the enclosure and its battery pack during installation and removal of the battery pack from the vehicle. These support features may require additional reinforcement.

Glass fiber is a suitable reinforcing material and readily available in all of the forms which may be required. It may be preferred to use fabric and other reinforcing forms fabricated using higher strength fibers such as carbon or aramid fibers. Such reinforcements may be used exclusively or in combination with reinforcing forms (cloth, mat or fiber) of any other reinforcement material.

These supports may be prepared by impregnating the reinforcing structures with resin, to form a prepreg-type material. The material would then be cut into shapes to fit the support structure tooling, layered to form a preform, placed into a two-piece mold; The mold is then closed to force the material to conform to the inner cavity of the mold, heated to a formulation-dependent temperature of between about 25° C. and 200° C. and held closed for between about 2 to 5 minutes before opening the mold and removing the molded structure. The material may be prepared in quantities sufficient to form only a single support structure, but it is often more efficient, particularly for woven reinforcements which may be obtained as long rolls, to form a continuous rolled length of material and cut off appropriate lengths as required In another embodiment, a thermoplastic resin such as polyamide or polyphenylene sulfide could be used instead of a thermoset. In this case, the fabric would be impregnated with the molten resin, and then allowed to cool, forming generally flat sheets. Alternatively, a reinforcement strand already impregnated with a thermoplastic resin or comingled with a thermoplastic resin fibers could be woven directly into a fabric. This fabric would be cut to shape, then preheated above the molding temperature, placed in the mold, and the mold temperature maintained below the glass transition temperature of the resin until the resin has sufficiently cooled, usually less than a minute.

In another embodiment, an electrically and/or magnetically conductive material, such as a scrim made of a finely formed nickel fiber, could be molded into the composite structure. This would prevent possible electromagnetic interference between the electronics used in the battery pack and electronics used in other systems of the vehicle.

It will be appreciated that although the practices of the invention have been illustrated by reference to their application to the battery support, that these practices may also be applied to the cover. Inasmuch as the support and cover cooperate to retain and restrain the battery, the practices of the invention may be applied to one or more of the cover and support while still obtaining the benefits of the invention.

Figure 7:
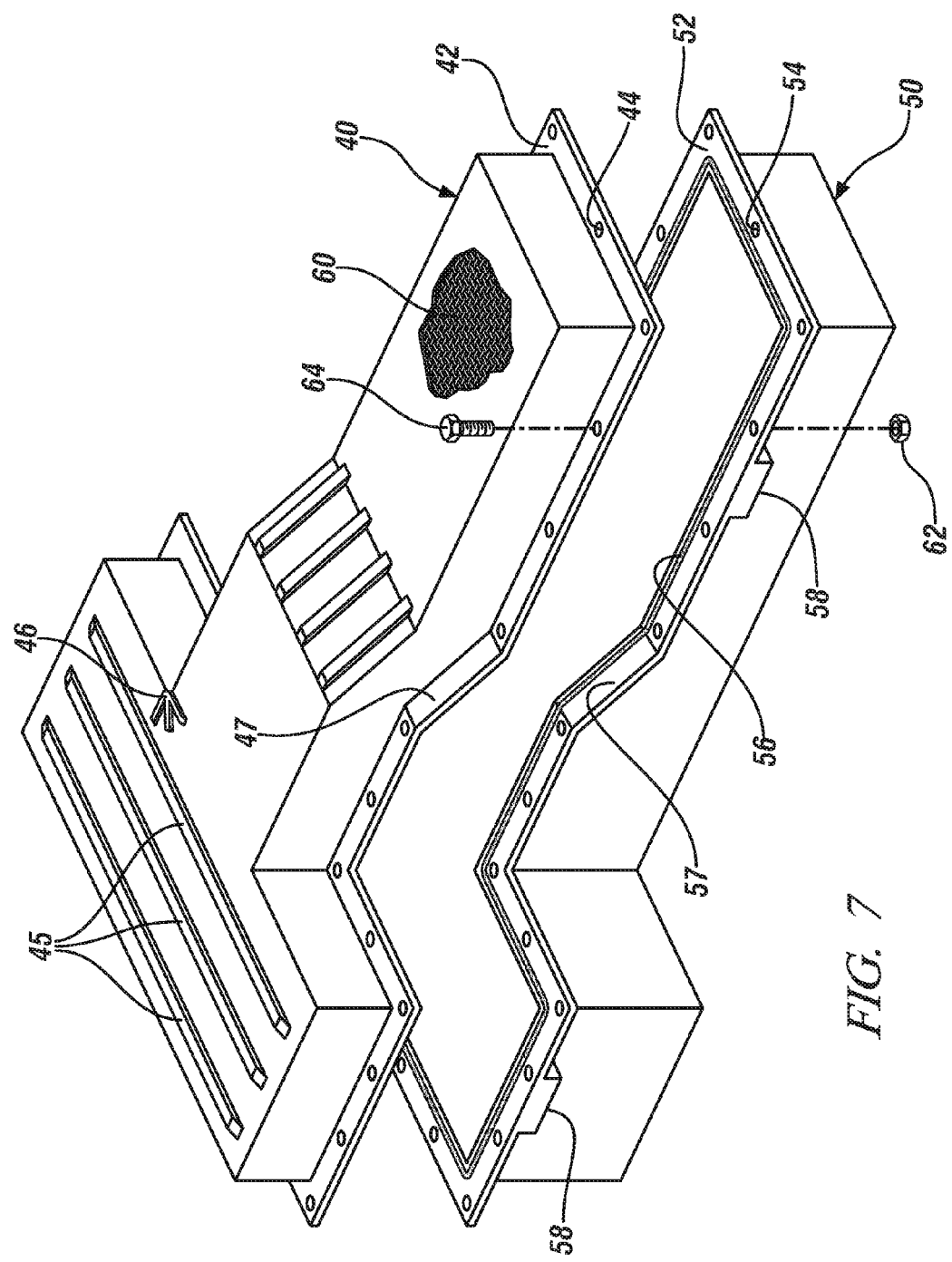
FIG. 7 shows, in perspective exploded view a representative battery support and cover fabricated of woven fiber reinforced polymers and incorporating stiffening ribs, mating flanges, a continuous polymeric seal, reinforced lifting pads and matched openings suitable for bolted attachment of the cover to the support.

For example, a representative support and cover incorporating many of the above-discussed features is shown in FIG. 7. Thin-walled cover 40 and support 50 have a plan view shape generally resembling the letter "T". Each of cover 40 and support 50 are fabricated of a woven fiber-reinforced polymer with a portion of the fiber reinforcement illustrated at windowed opening 60. Cover 40 and support 50 have complementary, generally horizontal flanges 42, 52 incorporating ramps 47 and 57 respectively. Flange 52 of support 50 incorporates a polymeric seal 56, generally resembling an O-ring, located inboard of holes 54. Holes 44 of cover flange 42 align with matching holes 54 in support flange 52 and are sized to accept mechanical fasteners such as representative bolt 64 which may be secured by nut 62. Nut 62 is here shown as a separate entity but those skilled in the art will appreciate that it may be molded into and incorporated into flange 52 to simplify assembly. Suitably rivets or clamps may also be employed to secure flanges 42 and 52 together. Cover 40 is stiffened by longitudinal ribs 45 and radial ribs 46, here shown protruding outwardly. Additional stiffening ribs may be incorporated in cover 50 and similar stiffening features may be incorporated into support 50 but are not shown for clarity. Reinforced lifting pads 58 have incorporated into support 50 at selected flange 52 locations to facilitate lifting and transport of the cover and support and the associated battery pack (not shown). Alternatively hooks or other features may be molded into the enclosure or, some of the bolt fasteners may be replaced with threaded fastener with an eye which may be engaged by a hook for lifting and transporting the enclosure. As has been noted previously the cover and support may be of variable thickness; may be of like or unlike polymers; and may incorporate like or unlike woven reinforcements, optionally supplemented by non-woven fibrous reinforcements.

While preferred embodiments of the invention have been described and illustrated, these are not intended to limit the scope of the invention.

The invention claimed is:

1. An assembled support enclosure for a high voltage battery pack for an electric or hybrid vehicle, the enclosure comprising:

a one-piece, molded, lower battery support and a one-piece, molded cover, each of the cover and the support having a thickness and stiffening ribs and each of the cover and support being formed of a molded polymer impregnating one or more layers of coextensive woven fiber reinforcements extending throughout the support and cover and, optionally, additional, like-impregnated, reinforcing fibers in preselected locations, the assembled support enclosure defining a shaped volume bounded by a support base with a continuous, upwardly-extending support wall and by a cover face with a continuous, downwardly-extending cover wall, the shaped volume being suitable for receiving and accommodating the battery pack;

each of the stiffening ribs comprising like-impregnated, added reinforcing fibers;

the support and cover walls having flanges, each of the support and cover flanges having a length and at least one of such flanges comprising an elastomeric seal, the flanges being positioned at the upper extremity of the upwardly extending support wall and at the lower extremity of the downwardly-extending cover wall;

the cover and support flanges being complementary along their lengths and having aligned openings suitable for receiving mechanical fasteners for securing the cover to the support to thereby form the enclosure, the support flange further comprising additional reinforced features adapted and configured to support the weight of the enclosure and an associated battery pack during transport and handling of the enclosure and its associated battery pack.

2. The assembled support enclosure for a high voltage battery pack for an electric or hybrid vehicle recited in claim 1 in which the support and cover are single-walled and one of the support and cover is of variable thickness.

3. The assembled support enclosure for a high voltage battery pack for an electric or hybrid vehicle recited in claim 1 in which the support and cover each have a length, and each of the support and cover have a first height over a first portion of their length, each of the support and cover have a second height over a second portion of their length and each of the support and cover have a progressively changing height over the remaining portions of their length so that a portion of the mating flange comprises a ramp.

4. The assembled support enclosure for a high voltage battery pack for an electric or hybrid vehicle recited in claim 1 in which the support comprises a first polymer and the cover comprises a second polymer.

5. The assembled support enclosure for a high voltage battery pack for an electric or hybrid vehicle recited in claim 1 in which the support comprises a first reinforcement and the cover comprises a second reinforcement.

6. The assembled support enclosure for a high voltage battery pack for an electric or hybrid vehicle recited in claim 1 in which the mechanical fasteners are bolts, rivets or clamps.

7. The assembled support enclosure for a high voltage battery pack for an electric or hybrid vehicle recited in claim 1 in which the stiffening ribs are linear.

8. The assembled support enclosure for a high voltage battery pack for an electric or hybrid vehicle recited in claim 1 further comprising one or more of an electrically conductive material and a magnetically conductive material molded into the enclosure.

9. The assembled support enclosure for a high voltage battery pack for an electric or hybrid vehicle recited in claim 1 in which the enclosure, in plan view, has the general shape of a "T".

10. A reinforced polymer enclosure for a high voltage battery pack for an electric or hybrid vehicle, the enclosure comprising:
a one-piece molded support and a one-piece molded cover, the support having a base with a base perimeter and the cover having a face with a face perimeter;
the support having an upstanding support wall extending from the base perimeter and the cover having a downstanding cover wall extending from the face perimeter;
the support wall terminating in an outwardly-extending support flange elevationally spaced apart from the base, and the cover wall terminating in an outwardly-extending cover flange elevationally spaced apart from the face, the entirety of the support flange being adapted to mate with the entirety of the cover flange;
the cover being stacked atop the support with the face overlying the base and the cover and support being secured together by mechanical fasteners along a joint line corresponding to the line of contact of the mating support and cover flanges, one or both of the mating flanges incorporating an elastomeric seal;
both of the support and cover comprising one or more woven fiber layer reinforcements extending throughout the support and/or cover and impregnated by vinyl ester resin-based polymer, at least one of which woven fiber layers is a coarse strand, woven glass cloth, and, supplementary like-impregnated, woven or non-woven fiber reinforcement layers comprising like-impregnated, added reinforcing fibers, formed in preselected regions of the support and cover; and,
the enclosure comprising a cavity shaped and proportioned to receive and retain the high voltage battery pack, the support and cover cooperating to retain and restrain the battery pack during vehicle operation.

11. The reinforced polymer enclosure for a high voltage battery pack for an electric or hybrid vehicle recited in claim 10, the enclosure further comprising ribs or corrugations, each of the ribs or corrugations comprising additional, like-impregnated, fiber reinforcements.

12. A reinforced polymer enclosure for a high voltage battery pack for an electric or hybrid vehicle, the enclosure comprising:
a one-piece molded support and a one-piece molded cover, the support having a base with a base perimeter and the cover having a face with a face perimeter, each of the base and face perimeters having a leg portion and an arm portion, transverse to the leg portion, the arm and leg portions being arranged so that the face and base perimeters form the shape of a letter 'T';
the support having an upstanding support wall extending from the base perimeter and the cover having a downstanding cover wall extending from the face perimeter;
the support wall terminating in an outwardly-extending support flange elevationally spaced apart from the base and the cover wall terminating in an outwardly-extending cover flange elevationally spaced apart from the face, each of the support flange and cover flange having a ramped portion, the entirety of the support flange being adapted to mate with the entirety of the cover flange;
the cover being stacked atop the support with the face overlying the base and the cover and support being secured together by mechanical fasteners along a joint line corresponding to the line of contact of the mating support and cover flanges, one or both of the mating flanges incorporating an elastomeric seal;
each of the support and cover being unitary structures formed of one or more woven fiber layer reinforcements extending throughout the support and cover and impregnated by a thermoset or a thermoplastic polymer, the cover having two planar portions connected by a ramped portion, a first planar portion comprising the arm of the 'T', and a second planar portion comprising the leg of the 'T', the ramped cover portion having longitudinal stiffening ribs oriented parallel to the leg portion and the first planar cover portion having molded-in, radially-extending stiffening ribs and molded-in transverse stiffening ribs oriented parallel to the arm portion, the stiffening ribs incorporating like-impregnated, woven or non-woven fiber reinforcement, the rib reinforcements being additional to the through-extending woven fiber layer reinforcements to provide additional reinforcement; and,
the enclosure comprising a cavity shaped and proportioned to receive and retain the high voltage battery pack, the support and cover cooperating to retain and restrain the battery pack during vehicle operation.

13. The reinforced polymer enclosure for a high voltage battery pack for an electric or hybrid vehicle recited in claim 12 in which the woven fiber is one of the group consisting of glass fibers, carbon fibers and aramid fibers.

14. The reinforced polymer enclosure for a high voltage battery pack for an electric or hybrid vehicle recited in claim 12 further comprising reinforced attachment means attached to, or embedded in, the enclosure to support the weight of the enclosure and a battery pack to enable lifting and transporting the enclosure, and the battery pack, during installation of the enclosure in a vehicle.

15. The reinforced polymer enclosure for a high voltage battery pack for an electric or hybrid vehicle recited in claim 12, the support further comprising a molded-in low density material.

16. The reinforced polymer enclosure for a high voltage battery pack for an electric or hybrid vehicle recited in claim 12 in which the polymer is a thermoplastic.

17. The reinforced polymer enclosure for a high voltage battery pack for an electric or hybrid vehicle recited in claim 16 in which the thermoplastic polymer is one or more of polyamide and polyphenylene sulfide.

18. The reinforced polymer enclosure for a high voltage battery pack for an electric or hybrid vehicle recited in claim 12 in which the polymer is a cured thermosetting resin.

19. The reinforced polymer enclosure for a high voltage battery pack for an electric or hybrid vehicle recited in claim 18 in which the thermosetting resin is one of epoxy and vinyl ester.

* * * * *